US008600677B2

(12) United States Patent
Jung et al.

(10) Patent No.: US 8,600,677 B2
(45) Date of Patent: Dec. 3, 2013

(54) METHOD FOR FEATURE RECOGNITION IN MOBILE COMMUNICATION TERMINAL

(75) Inventors: Woo-Jin Jung, Yongin-si (KR); Hyun-Su Hong, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 903 days.

(21) Appl. No.: 12/590,876

(22) Filed: Nov. 16, 2009

(65) Prior Publication Data

US 2010/0131195 A1     May 27, 2010

(30) Foreign Application Priority Data

Nov. 27, 2008  (KR) .................. 10-2008-0119178

(51) Int. Cl.
*G01C 21/00* (2006.01)
(52) U.S. Cl.
USPC .......................... 701/532; 348/116; 382/190
(58) Field of Classification Search
USPC ................. 701/532, 533; 348/116, E7.085; 382/190, 218
See application file for complete search history.

(56) References Cited

U.S. PATENT DOCUMENTS

| | | | | |
|---|---|---|---|---|
| 5,390,258 | A * | 2/1995 | Levin | 382/131 |
| 5,546,472 | A * | 8/1996 | Levin | 382/131 |
| 5,670,935 | A * | 9/1997 | Schofield et al. | 340/461 |
| 6,282,317 | B1 * | 8/2001 | Luo et al. | 382/203 |
| 8,150,098 | B2 * | 4/2012 | Gallagher et al. | 382/100 |
| 8,155,826 | B2 * | 4/2012 | Nakamura et al. | 701/33.4 |
| 8,184,861 | B2 * | 5/2012 | Nakamura et al. | 382/104 |
| 2002/0130953 | A1 * | 9/2002 | Riconda et al. | 348/115 |
| 2007/0035562 | A1 * | 2/2007 | Azuma et al. | 345/633 |
| 2007/0172155 | A1 * | 7/2007 | Guckenberger | 382/305 |
| 2008/0104011 | A1 * | 5/2008 | Shibasaki et al. | 707/1 |
| 2008/0240506 | A1 * | 10/2008 | Nakamura et al. | 382/104 |
| 2008/0240573 | A1 * | 10/2008 | Nakamura et al. | 382/190 |
| 2010/0208937 | A1 * | 8/2010 | Kmiecik et al. | 382/100 |

FOREIGN PATENT DOCUMENTS

KR          10-0674805          12/2006

OTHER PUBLICATIONS

Yeo et al, Click4BuildingID@NTU: Click for Building Identification with GPS-enabled Camera Cell Phone, IEEE International Conference on Multimedia and Expo, 2007, pp. 1059-1062.*
Wang et al, Study on Crop Image Feature Extraction of Vehicle-Based Estimation System on Large-Scale Crop Acreage, 2007 International Conference on Machine Learning and Cybernetics, 2007, pp. 377-382.*

\* cited by examiner

*Primary Examiner* — Russell Frejd

(57) ABSTRACT

A portable terminal is configured to perform a method for feature recognition. The portable terminal includes a Global Positioning System (GPS), a camera, a sensor, an image geographic information part, an image processor, and a controller. The GPS provides a position of the portable terminal. The camera photographs an image of a feature. The sensor detects a direction of the camera. The image geographic information part stores an image of each feature and geographic information on each feature. The image processor extracts a characteristic of the image of the feature and compares the extracted characteristic with image information stored in the image geographic info illation part. If recognizing a specific feature through the image processor, the controller proportionally compares geographic information of the image geographic information part with size and direction data on a peripheral feature near the specific feature within an image, and recognizes the peripheral feature.

19 Claims, 6 Drawing Sheets

METHOD FOR FEATURE RECOGNITION IN MOBILE COMMUNICATION TERMINAL

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Nov. 27, 2008 and assigned Serial No. 10-2008-0119178, the contents of which are herein incorporated by reference.

TECHNICAL FIELD OF THE INVENTION

The present invention relates to a method for providing geographic information using a camera and a Global Positioning System (GPS) in a mobile communication terminal. More particularly, the present invention relates to a method for recognizing a feature using a camera of a mobile communication terminal and, when displaying information on the recognized feature in a real image, providing information on a feature around the recognized feature using a position of the recognized feature and direction information in which a user looks.

BACKGROUND OF THE INVENTION

GPS is the abbreviation of a global positioning system developed by the Pentagon. The GPS includes a plurality of GPS satellites and a GPS receiver. The plurality of GPS satellites are arranged by four in each of six circular orbits of an inclination angle of 55°. The plurality of GPS satellites transmits their own position information signals while moving in a cycle of about 12 hours. The GPS receiver receives position information signals from at least four or more GPS satellites among the plurality of GPS satellites, detects its distances from the GPS satellites and position vectors of the GPS satellites, and calculates its own position vector. A navigation system including the GPS receiver maps its own position vector calculated from the GPS receiver on map data, and displays the mapped position vector. The navigation system provides, as a supplementary service, a road guidance service for informing the shortest path from a current position on a map to a user's destination. Therefore, a user can more easily find a way to her own destination by carrying the navigation system.

FIG. 1 illustrates a block diagram of a construction of a portable terminal for recognizing an image using a camera according to the conventional art. As illustrated in FIG. 1, a navigation system is integrated with a camera 104. The navigation system can include a command input part 112, a GPS receiver 100, a map data storage part 108, a sensor 110, an image processor 106, and a controller 102. The command input part 112 receives an input of a user's operation command. The GPS receiver 100 receives a position information signal transmitted by a GPS satellite. The map data storage part 108 stores map data. The sensor 110 detects a direction angle of the camera 104 and an inclination angle through a geomagnetic sensor and an angle meter. The image processor 106 processes an image captured by the camera 104. The controller 102 captures an image photographed by the camera 104 at a predetermined time interval, searches the map data storage part 108 for buildings of position information consistent with respective buildings within the captured image, and matches them with each other.

However, the conventional art has a disadvantage of consuming much time because having to display geographic information on several features. In this case, the portable terminal has to recognize one feature and display geographic information and, after that, again recognize a next feature and display geographic information. In theory, assuming that number of features required to display geographic information is equal to 'n' and a time taken to recognize one feature is equal to 't', a time taken to display geographic information on the total features is equal to 'n*t'. However, because the 't' can be a long time, a user has to spend much time to obtain interested information.

SUMMARY OF THE INVENTION

To address the above-discussed deficiencies of the prior art, it is a primary object to provide at least the advantages below. Accordingly, one aspect of the present invention is to recognize a user's current position using a Global Positioning System (GPS), recognize a specific feature using a camera, and provide geographic information around the specific feature using position information on the recognized feature and direction information of the camera input from a sensor. In this case, upon recognition of only an initial feature, geographic information on the feature can be easily displayed using previously stored data.

The above aspects are achieved by providing a method for feature recognition in a mobile communication terminal.

According to one aspect of the present invention, a portable terminal is provided. The portable terminal includes a GPS, a camera, a sensor, an image geographic information part, an image processor, and a controller. The GPS provides a position of the portable terminal. The camera photographs an image of a feature. The sensor detects a direction of the camera. The image geographic information part has an image of each feature and geographic information on each feature. The image processor extracts a characteristic of the image of the feature obtained in the camera and compares the extracted characteristic with image information stored in the image geographic information part. If recognizing a specific feature through the image processor, the controller proportionally compares geographic information of the image geographic information part with size and direction data on a peripheral feature near the specific feature within an image, and recognizes the peripheral feature.

The camera may capture an image if there is no motion for a predetermined time.

The sensor can include a geomagnetic sensor.

The image geographic information part can include width and height information on the feature.

According to another aspect of the present invention, a method for feature recognition in a portable terminal is provided. The method includes recognizing a current position of the portable terminal by a GPS, photographing an image of a feature by a camera, detecting a direction of the camera using a sensor, extracting a characteristic of the image of the feature photographed by the camera and comparing the extracted characteristic with image information on a feature positioned in a direction of the camera on a position of the portable terminal and, if recognizing a specific feature, comparing geographic information of an image geographic information part with distance and direction data on a peripheral feature near the specific feature within an image, and recognizing the peripheral feature.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 2 through 6B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile terminal.

Figure 1:
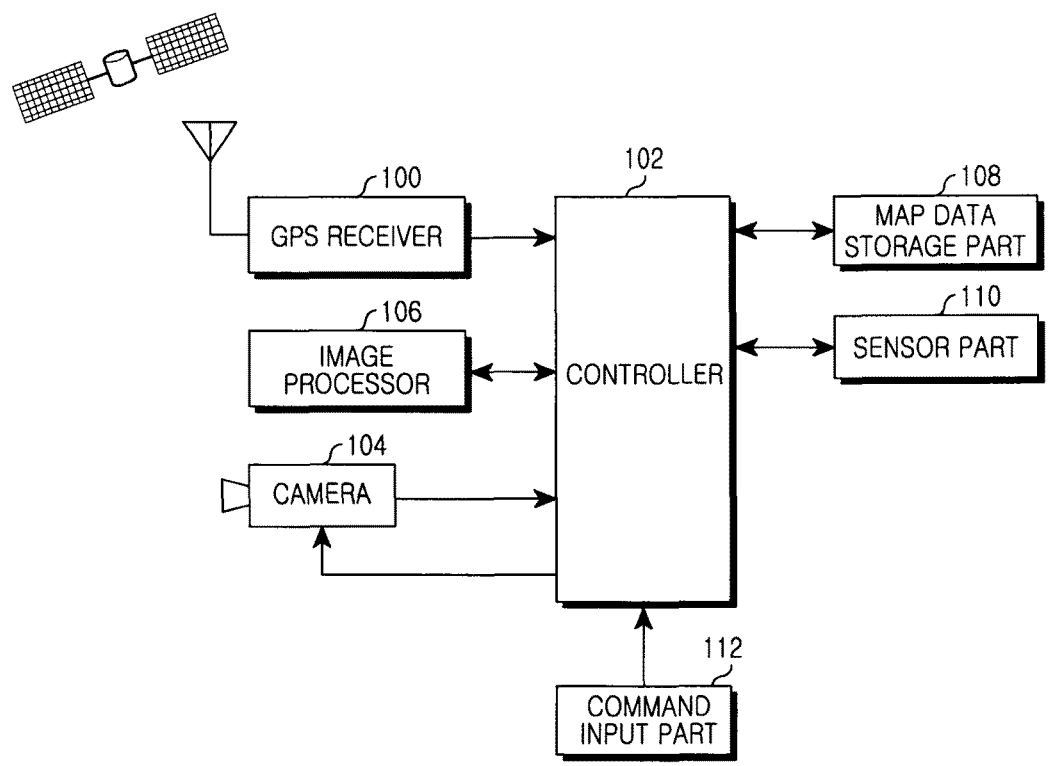
FIG. 1 illustrates a block diagram of a construction of a portable terminal for recognizing an image using a camera according to the conventional art.
Figure 2:
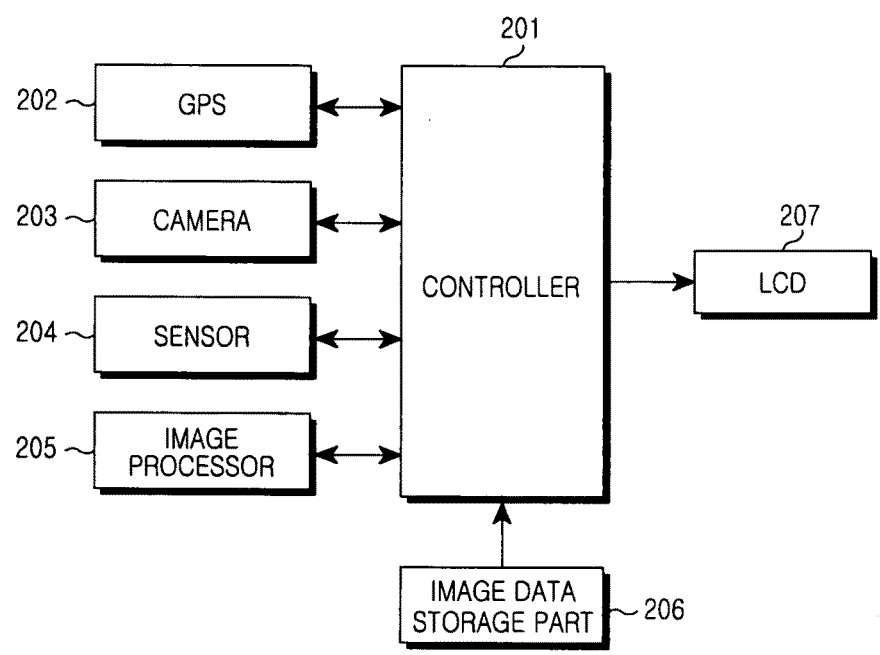
FIG. 2 illustrates a block diagram of a construction of an image recognition portable terminal according to an exemplary embodiment of the present invention.

FIG. 2 illustrates a block diagram of a construction of an image recognition portable terminal according to an exemplary embodiment of the present invention.

Referring to FIG. 2, the portable terminal includes a controller 201, a GPS 202, a camera 203, a sensor 204, an image processor 205, an image data storage part 206, and a Liquid Crystal Display (LCD) 207. The GPS 202 can recognize a user's current position. The camera 203 can recognize a real image. The sensor 204 can detect a motion and direction of the terminal, i.e., the camera 203. The image processor 205 can extract a characteristic of a captured image, and can compare the characteristic with image data stored in the image data storage part 206. The image data storage part 206 is operable to store image data on each feature and geographic information on the feature. The controller 201 can control each part. The LCD 207 displays the real image and the geographic information.

The GPS 202 is able to recognize a user's current position. User position information is used to reduce an amount of comparison-target data stored in the image data storage part 206 at the time of image recognition through the camera 203. That is, the position information is used to reduce a time consumed for image recognition by, upon image recognition, not comparing with all data in the image data storage part 206 but comparing a recognized image with only data on the vicinity of the current position recognized by the GPS 202.

The controller 201 can capture an image using the camera 203 when determining that there is no motion of the terminal for a predetermined time using motion information on the terminal input from the sensor 204. The controller 201 compares the captured image with image data previously stored in the image data storage part 206 through the image processor 205, and detects geographic information on a captured feature.

The sensor 204 includes an acceleration sensor and a geomagnetic sensor. The sensor 204 is attached to the terminal and thus, can detect a direction of the terminal, for example, a direction of the camera 203, and can also measure an attitude of the terminal. When determining that there is no change of the attitude of the terminal for a predetermined time using attitude information on the terminal, the controller 201 determines that a user is concerned about a specific feature photographed by the camera 203 at this time and captures an image of this time. Also, the sensor 204 detects a direction corresponding to this time through the geomagnetic sensor and, later on, uses the detected direction for information matching with a peripheral feature.

The image data storage part 206 can store image data on each feature, and can include position information and name information corresponding to each feature. Thus, the image data storage part 206 compares an image of a specific feature captured by the camera 203 with a previously stored image, and detects a name and position of the captured image. Particularly, the image data storage part 206 includes 3-Dimensional (3D) information (width and height information) on a feature. Thus, if an image is recognized through the camera 203, the controller 201 compares previously stored width information with width information displayed on a screen and calculates how far a real distance per pixel of the screen is. At this time, the image data storage part 206 detects information on a peripheral feature near the specific feature using the detected position information on the specific feature.

Also, the controller 201 can calculates a real distance between the detected position of the specific feature, which is a standard, and the peripheral feature. Thereafter, the controller 201 converts the real distance between the standard feature and the peripheral feature into a distance on the screen. At this time, the controller 201 can convert the real distance between the two features into the distance on the screen using information on the previously calculated real distance per pixel. The controller 201 matches geographic information on the peripheral feature to a real image using the calculated distance information on the screen from the standard feature on the screen.

Figure 3:
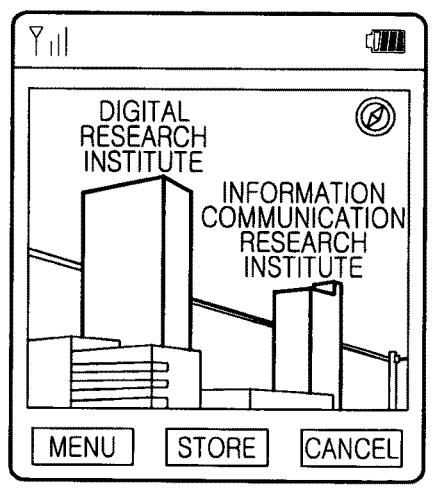
FIG. 3 illustrates a diagram for an operation screen of an image recognition portable terminal according to an exemplary embodiment of the present invention.

FIG. 3 illustrates an example operation screen of the present invention. A GPS recognizes a user's current position. Thereafter, if a camera recognizes a building of "Digital Research Institute" that is a standard feature through an image processor, a controller matches an indication named "Information Communication Research Institute" to a real image using direction information input from a sensor and position information on the two buildings loaded from an image data storage part.

Figure 4:
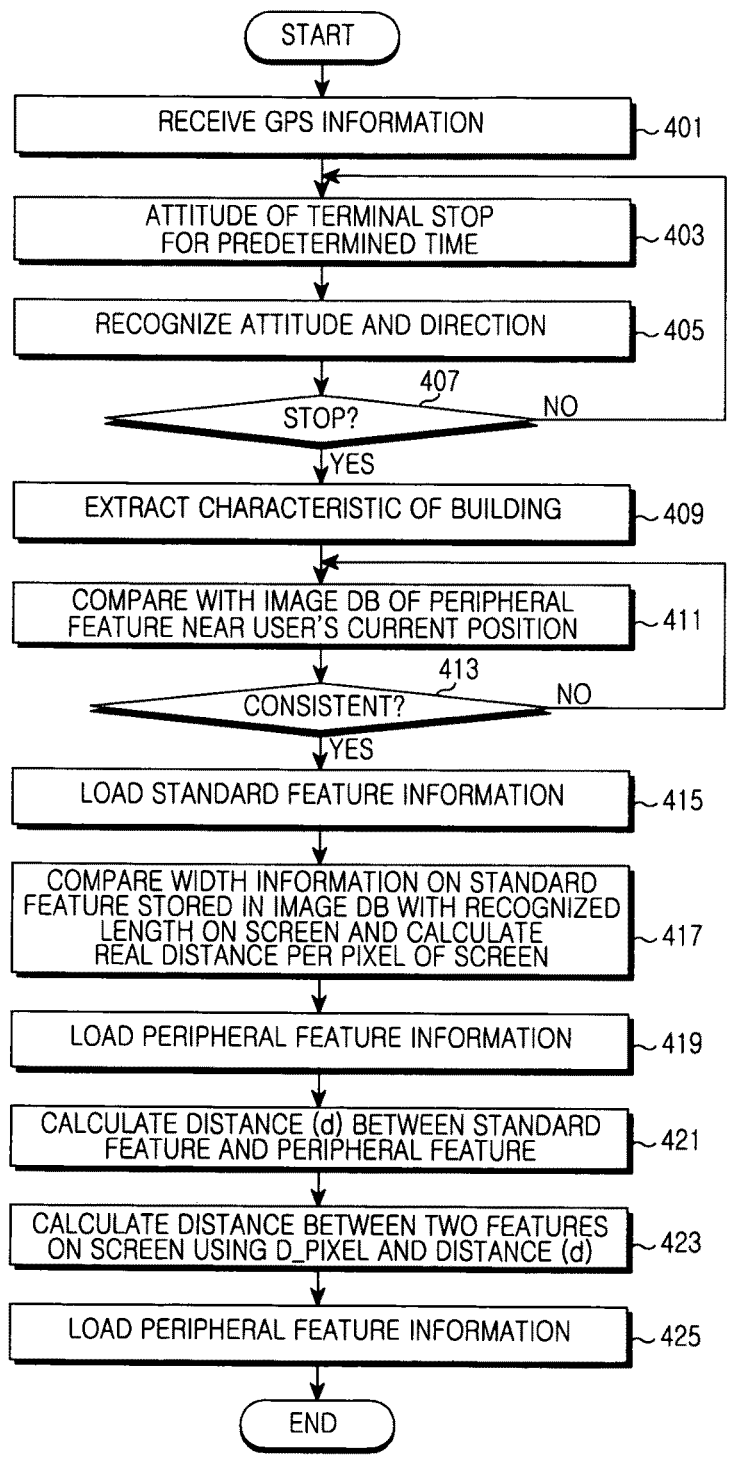
FIG. 4 illustrates a flow diagram for a method for matching of geographic information on a feature between an image captured by a camera and image data stored in an image data storage part according to an exemplary embodiment of the present invention.

FIG. 4 illustrates a flow diagram for a method for matching of geographic information on a feature between an image captured by a camera and image data stored in an image data storage part according to an exemplary embodiment of the present invention.

In step 401, if a mobile communication terminal user powers on a GPS receiver included in a mobile communication terminal, the GPS recognizes a user's current position.

Thereafter, while the user photographs a peripheral feature using a camera, a sensor recognizes if the user photographs a specific feature for a predetermined time, i.e., the sensor determines that there is no change of an attitude of the camera through a sensor, and a controller captures an image of the specific feature. At this time, if the sensor does not determine a non-change of an attitude of the camera (i.e., there is no stop determination), the controller determines that the user is not concerned in the specific feature, and does not capture an image. (steps 403 to 407)

Then, if the controller captures the image of the specific feature, in step 409, an image processor extracts a characteristic of the specific feature.

The controller compares the extracted characteristic of the specific feature with image information stored in the image data storage part, and loads geographic information on the captured specific feature. Then, the controller uses only data on a peripheral feature that is in the vicinity of the user's current position for image recognition using the user's current position information. The controller acquires name, position, width, and height information on a feature stored in the image data storage part. When this process is completed, the feature becomes a standard feature. (steps 411 to 415)

Figure 5:
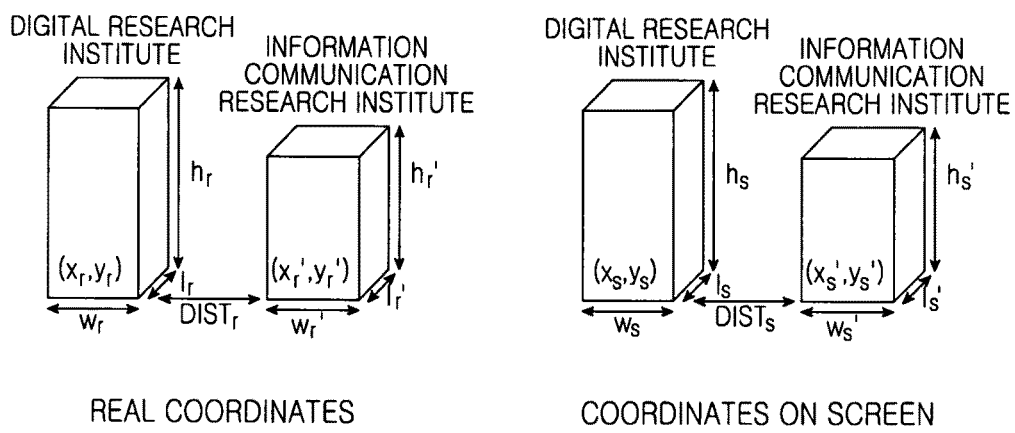
FIG. 5 illustrates a diagram for a process of matching based on a size rate between a real feature and a photographed image in FIG. 4.

Then, the controller compares width and height information on the standard feature with width and height information on a screen and calculates a real distance indicated by one pixel on the screen. FIG. 5 illustrates the above process. If a "Digital Research Institute" is recognized as a standard feature, the controller extracts $(x_s, y_s)$, $w_s$, $l_s$, and $h_s$, and loads $(x_r, y_r)$, $w_r$, $l_r$, and $h_r$ from the image data storage part. At this time, the controller compares the $w_s$, $l_s$, and $h_s$ with the $w_r$, $l_r$, and $h_r$, and calculates a real distance indicated by one pixel of the screen. Then, the controller loads real coordinates $(x_r', y_r')$, $w_r'$, $l_r'$, and $h_r'$ of an "Information Communication Research Institute" that is information on a peripheral feature around the $(x_r, y_r)$. Then, the controller calculates $dist_s$ using $dist_r$ and the previously calculated real distance information per one pixel. Lastly, the controller calculates the $(x_s', y_s')$ using the user direction information and the $dist_s$ on the basis of the $(x_s, y_s)$ (steps 417 to 425)

Figure 6A:
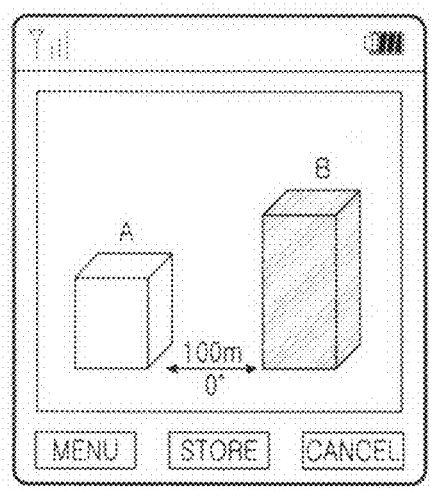
FIGS. 6A and 6B illustrate diagrams of screens for recognizing a feature when photographing the feature in opposite positions.
Figure 6B:
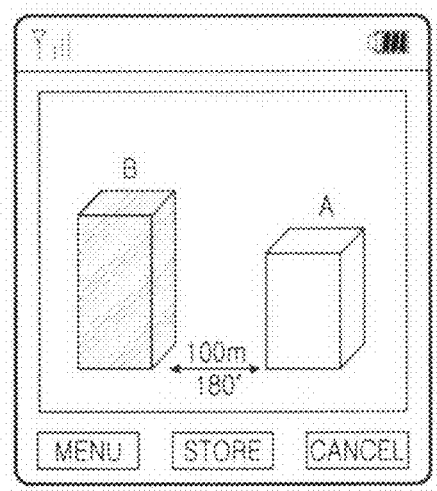

FIGS. 6A and 6B illustrate a simple concept of calculating coordinates $(x_s', y_s')$. In an example, it is assumed that, when user direction information is equal to 0°, i.e., in a state where a user directs to due north, an object (B) having screen coordinates $(x_s', y_s')$ is a feature located on the left of an object (A) having screen coordinates $(x_s, y_s)$ as shown in FIG. 6A. However, when the user direction information is equal to 180°, unlike when the user direction information is equal to 0°, the feature (B) is positioned and output on the right of the object (A) on a screen. This is because a position of a peripheral feature positioned on the screen centering on a standard feature is varied depending on a user's position and direction. By this method, the controller can detect whether the peripheral feature is positioned on the right or left of the standard feature on the screen using the user direction information.

Lastly, the controller outputs geographic information on the peripheral feature in the calculated coordinates $(x_s', y_s')$, thereby being capable of matching the geographic information on the peripheral feature to a real image.

The present invention simply photographs a feature without a user's specific operation command and therefore, captures an image and matches not only geographic information on the captured feature but also geographic information on a peripheral feature to a real image, thus having an advantage that a user can easily recognize a feature.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A portable terminal comprising:
   a Global Positioning System (GPS) configured to provide a position of the portable terminal;
   a camera configured to capture an image of a feature, wherein the camera is configured to capture an image if the portable terminal is still for a predetermined time while capturing the image;
   a sensor configured to detect a direction of the camera;
   an image geographic information part comprising image information;
   an image processor configured to extract a characteristic of the captured image of the feature and compare the extracted characteristic with image information stored in the image geographic information part; and
   a controller configured to proportionally compare, in response to recognizing a specific feature through the image processor, geographic information of the image information with size and direction data on a peripheral feature near the feature within the captured image, and configured to recognize the peripheral feature,
   wherein the direction data corresponds to the direction of the camera which is detected by the sensor.

2. The terminal of claim 1, wherein the sensor comprises a geomagnetic sensor.

3. The terminal of claim 1, wherein the image geographic information part comprises width and height information on the feature.

4. The terminal of claim 1, wherein the image information comprises an image for each of a plurality of features and geographic information corresponding to each of the plurality of features.

5. The terminal of claim 1, wherein the sensor is configured to determine a motion of the camera.

6. The terminal of claim 1, wherein the controller is configured to store information as a standard feature.

7. The terminal of claim 6, wherein the controller is configured to acquire a name, a position, a width, and height information on a feature stored in the image geographic information part.

8. A method for feature recognition in a portable terminal, the method comprising:
   recognizing a current position of the portable terminal by a Global Positioning System (GPS);
   photographing an image of a feature by a camera, wherein the camera is configured to capture an image if the portable terminal is still for a predetermined time while capturing the image;
   detecting a direction of the camera using a sensor;

extracting a characteristic of the image of the feature photographed by the camera;

comparing the extracted characteristic with image information on a feature positioned in a direction of the camera on a position of the portable terminal; and if recognizing a specific feature, comparing geographic information of an image geographic information part with distance and direction data on a peripheral feature near the specific feature within an image, and recognizing the peripheral feature, wherein the direction data corresponds to the direction of the camera which is detected by the sensor.

9. The method of claim 8, wherein the sensor comprises a geomagnetic sensor.

10. The method of claim 8, wherein the image geographic information part comprises width and height information of the feature.

11. The method of claim 8, further comprising acquiring a name, a position, a width, and height information on a feature stored in the image geographic information part.

12. An image recognition device for use in a portable terminal, the image recognition device comprising:

a Global Positioning System (GPS) configured to provide a position of the portable terminal;

a camera configured to capture an image of a feature, wherein the camera is configured to capture an image if the portable terminal is still for a predetermined time while capturing the image;

an image geographic information part comprising image information;

an image processor configured to extract a characteristic of the captured image of the feature and compare the extracted characteristic with image information stored in the image geographic information part; and a controller configured to proportionally compare, in response to recognizing a specific feature through the image processor, geographic information of the image information with size and direction data on a peripheral feature near the feature within the captured image, and configured to recognize the peripheral feature, wherein the direction data corresponds to a direction of the camera which is detected by a sensor.

13. The image recognition device of claim 12, wherein the sensor comprises a geomagnetic sensor.

14. The image recognition device of claim 12, wherein the image geographic information part comprises width and height information on the feature.

15. The image recognition device of claim 12, wherein the image information comprises an image for each of a plurality of features and geographic information corresponding to each of the plurality of features.

16. The image recognition device of claim 12, wherein the sensor is configured to determine a motion of the camera.

17. The image recognition device of claim 12, wherein the controller is configured to acquire a name, a position, a width, and height information on a feature stored in the image geographic information part.

18. The image recognition device of claim 12, wherein the sensor is configured to determine a motion of the camera.

19. The image recognition device of claim 12, wherein the controller is configured to store information as a standard feature.

* * * * *